Oct. 13, 1970  E. Z. FINFER ET AL  3,533,748
REMOVAL OF SULFUR OXIDES FROM WASTE GASES
Filed Dec. 15, 1967
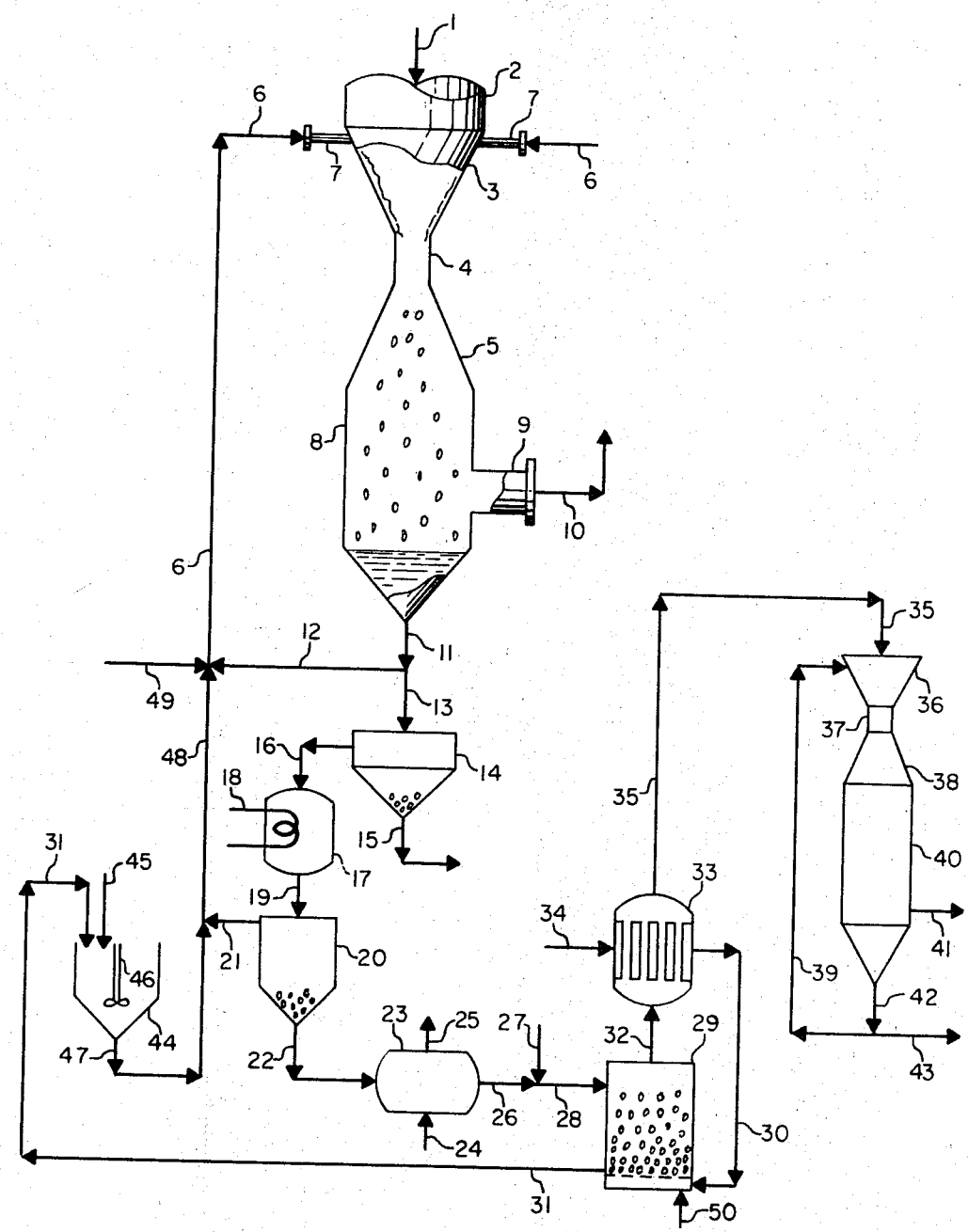
EDWARD Z. FINFER
HOWARD P. WILLETT
INVENTORS.
BY
AGENT United States Patent Office 3,533,748
Patented Oct. 13, 1970

3,533,748
REMOVAL OF SULFUR OXIDES FROM WASTE GASES
Edward Z. Finfer, New York, N.Y., and Howard P. Willett, Darien, Conn., assignors to Chemical Construction Corporation, New York, N.Y., a corporation of Delaware
Filed Dec. 15, 1967, Ser. No. 690,936
Int. Cl. C01b 17/04
U.S. Cl. 23—226                                4 Claims

ABSTRACT OF THE DISCLOSURE

Sulfur oxides are removed and recovered as elemental sulfur, from waste gas streams such as flue gas, by scrubbing the gas stream with an aqueous alkali solution. The solution absorbs the sulfur oxides, which react with alkali to form sulfite and sulfate in solution. The resulting solution is cooled to precipitate solid alkali metal sulfite and sulfate salts, which are separated from the solution and may be mixed with carbon. The salts or mixture is contacted at an elevated temperature with hot gases such as carbon monoxide and carbon dioxide, or a reducing gas such as a cracked hydrocarbon or natural gas, to liberate elemental sulfur vapor in a gas stream and convert the sulfite and sulfate to alkali, thereby regenerating the alkali which is recycled to the absorbing solution. The reducing gas stream is cooled to selectively condense the elemental sulfur product.

BACKGROUND OF THE INVENTION

Field of the invention

The invention relates to the removal of sulfur oxides contaminants from a waste gas before the waste gas is released to the outer air, so as to prevent air contamination, and the recovery of the contaminants in the form of elemental sulfur, which is a useful commercial product. The invention is particularly applicable to the removal of sulfur dioxide from the waste gases of power plants, steam generators, space heating boilers and chemical plants such as sulfuric acid production facilities and organic sulfonation processes. The sulfite and sulfate salts may be processed to elemental sulfur and alkali at the plant site or at a separate chemical plant.

Description of the prior art

Numerous procedures and systems have been proposed or developed for the removal of sulfur oxides, principally sulfur dioxide, from a waste gas stream such as flue gas, and for the recovery of the sulfur dioxide in a usable form as a commercial product.

U.S. Pat. No. 2,849,292 is typical of prior art procedures, and U.S. Pats. Nos. 2,919,976 and 2,106,952 are also pertinent. The U.S. Pats. Nos. 2,838,374 and 2,344,104 deal with the reduction of sulfites and sulfates.

SUMMARY OF THE INVENTION

In the present invention, a waste gas stream containing sulfur oxides, such as flue gas derived from the combustion of a carbonaceous liquid or solid fuel, is scrubbed with an aqueous solution of a soluble alkali. The alkali is preferably sodium carbonate or sodium hydroxide. The sulfur oxides are removed from the waste gas and are converted to soluble sulfite and sulfate in the absorbing solution. Thus, the invention is particularly applicable as an air pollution control system, where it is required to prevent the emissions of quantities and concentrations of sulfur dioxide to the outer air which are above the limits specified by air pollution control regulations and laws.

Waste gases such as a flue gas containing about 0.20% sulfur dioxide, 0.0025% sulfur trioxide, 12% carbon dioxide and fuel ash, are drawn or forced through a scrubber-absorber. Sulfur dioxide and sulfur trioxide are absorbed, and the ash is collected by the scrubbing liquid as it moves through the scrubber. The liquid is an aqueous solution of a soluble alkali which also contains recycle sulfite and sulfate. Sulfur dioxide and trioxide react with the alkali to form sulfite and sulfate respectively. An oxidation inhibitor is usually added to the makeup water to the scrubber-absorber to minimize oxidation of the sulfite.

The bleed stream from the scrubber-absorber system containing the dissolved salts and suspended ash such as fly ash enters a clarifier or filter, where the ash is removed. The supernatant solution is cooled in a crystallizer or partially evaporated removing a portion of the sulfite and sulfate salts as solids. The remaining solution is then recycled. The crystals, if hydrated are heated and reprecipitated in the anhydrous form and this supernatant liquid is recycled as well. They are then dried in an oxygen deficient atmosphere and are then preferably ground and mixed with pulverized coal or other suitable fuel.

The salts or carbon-salts mixture is charged into the reducer reactor. Hot gases from coal or other suitable fuel combustion, or a reducing gas such as cracked hydrocarbon or natural gas, are passed over the mixture. Elemental sulfur is liberated from the reaction, and the salts are converted to alkali. The alkali is returned to the scrubber-absorber as makeup alkali. The generated gas stream containing sulfur in the vapor state together with carbon dioxide, carbon monoxide and nitrogen is partially cooled in a heat exchanger, which also serves to preheat air for the hot gases heat source. The sulfur vapor is collected from the gas stream by further cooling, preferably by absorption into cooler molten sulfur in a gas scrubber. The waste gases leaving this scrubber are preferably burned in a boiler or otherwise utilized as a heat source.

The principal advantage of the invention is the attainment of highly efficient removal of typically 95% or higher, of the sulfur oxides present in dilute concentrations such as 0.2% by volume, in large volues of waste or flue gases, which may be generated in volumes of 1,000,000 cubic feet per minute or greater. The sulfur oxides which are converted into sulfites and sulfates are readily precipitated from the scrubber-absorber system as crystals. These salts are converted, at high temperatures, to the water soluble alkali used in the absorption stage, and the sulfur is reduced to the elemental state and recovered as a useful commercial product.

It is an object of the present invention to remove sulfur oxides from waste gas streams.

Another object is to recover sulfur oxides from a waste gas stream in the form of elemental sulfur.

A further object is to process waste gas streams such as flue gas, so that these streams may be discharged to the atmosphere without causing air pollution.

An additional object is to reduce sulfur oxides content in a waste gas stream to a low level, so that the waste gas stream complies with pollution control regulations and may be discharged to the atmosphere.

Still another object is to concomitantly remove sulfur oxides and fuel ash from a flue gas stream.

Still a further object is to recover sulfur oxides from a waste gas stream in the form of alkali sulfite and sulfate salts, which may be converted to elemental sulfur and alkali in an improved manner.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. Waste gas stream 1, typically consisting of a hot flue gas containing about 0.2% sulfur dioxide, a minor proportion of sulfur trioxide, and entrained fuel ash, is passed via conduit 2 into the converging inlet section 3 of a venturi gas scrubber-absorber, which is provided with a throat section 4 for concentrated gas-liquid contact, a divergent section 5 for the recovery of gas pressure drop and a falling liquid section for sulfur oxide absorption. Scrubbing liquid stream 6, consisting of aqueous alkali, sulfite and sulfate solution, is passed via one or a plurality of nozzles 7 onto the inner surface of section 3, and flows downwards for contact with the waste gas stream 1 in sections 4 and 5. Stream 6 will usually be at an initial temperature typically in the range of about 45° C. to 65° C., and will preferably contain dissolved sodium carbonate or sodium hydroxide, although other alkalies known to the art may be employed. When stream 6 contains for example dissolved sodium carbonate, the dissolved carbonate will be present in the solution in a concentration typically in the range of about 1 to 5 grams of dissolved alkali carbonate per 100 ml. of aqueous scrubbing solution.

Stream 6 is transversely projected into the downflowing high velocity gas phase at the throat section 4, and the liquid stream 6 is thereby dispersed into the gas stream in the form of liquid droplets, which wet and entrain fuel ash or other solids particles which may be present in the gas stream. In addition, as the mixture of gas phase and liquid droplets passes downwards through the diverging section 5 and falling liquid chamber section 8, a residence time is provided during which sulfur oxides are absorbed into the liquid droplets from the gas stream. The dissolved sulfur oxides react with the alkali in the liquid droplets to form sulfite and sulfate.

The lower portion of chamber 8 provides a disengaging space, from which the scrubbed gas phase separates from the liquid and moves horizontally into gas removal duct 9. Suspended aerosols are also removed from the gas phase. The cleaned waste gas stream 10 may now be discharged from duct 9 to atmosphere without causing air contamination. The liquid droplets collect in the bottom of chamber 8, from which the liquid stream 11 is removed. Stream 11 contains dissolved sulfite and sulfate as well as residual dissolved alkali and entrained fuel ash. Stream 11 is at an elevated temperature due to contact with waste gas stream 1, which may be produced from combustion processes where the gas temperatures are from 100° C. to 250° C. or higher. In most instances, the temperature of stream 11 will be in the range of 45° C. to 65° C., with the actual magnitude of the temperature of stream 11 depending mainly on the temperature and humidity of stream 1 and the vapor pressure of stream 6. Stream 11 is divided into stream 12, which is recycled via stream 6 as will appear infra, and stream 13 which is subjected to further processing in accordance with the present invention.

Stream 13 is passed to clarifier 14, or other device for settling or filtering entrained solid particles such as fly ash from the liquid stream. The settled solids stream 15 is removed from unit 14 and processed for waste disposal. The clarified liquid stream 16 discharged from unit 14 is passed to a unit where a portion of the dissolved alkali sulfite and sulfate is selectively precipitated or crystallized as a solid. This unit can be an evaporator or cooler-crystallizer 17. In unit 17, the liquid is cooled to a reduced temperature typically in the range of about 5° C. to 40° C., by heat exchange with a suitable fluid coolant such as cooling water which is circulated through coil 18. The resulting process stream 19 is passed to settler-separator 20, in which the solid crystals are separated from the residual clear solution stream 21, which now contains residual alkali sulfite and sulfate, and alkali carbonate, and which is recycled as will appear infra.

The solids stream 22 removed from unit 20 now consists of water-containing crystals of alkali sulfite and sulfate, and stream 22 is processed in accordance with the present invention to produce elemental sulfur and regenerate alkali for recycle. Steam 22 is passed into a crystal dehydrating unit 23, which may consist of a heater for precipitating anhydrous crystals from hydrated ones. A hot gas stream 24 such as hot filtered flue gas is passed into unit 23, for dehydration. The resulting gas stream 25 is discharged from unit 23.

The dried solid crystals stream 26 discharged from unit 23 is now preferably mixed with solid particulate carbon stream 27, which usually consists of pulverized coal. The resulting mixed solids stream 28 is passed into reducer-reactor 29, which can be a fluid bed reactor, in which the solids particles mixture of sulfite, sulfate and coal is contacted with hot gases at elevated temperature to liberate elemental sulfur and convert the sulfite and sulfate to alkali. In this embodiment of the invention, preheated air stream 30 which is at an initial temperature typically in the range of about 400° C. to 500° C. is passed into combustion unit 29 below the fluid bed reactor to burn coal stream 50 or other suitable fuel. The hot combustion gases enter the fluid bed reactor formed by stream 28, and a reaction takes place in unit 29 between stream 30 and the fluidized solids at a temperature typically in the range of about 700° C. to 1000° C. Regenerated solid alkali stream 31 is removed from unit 29 via a lower fluidized solids takeoff, and stream 31 is recycled as a component of stream 6. Other heated reducing gases such as a cracked hydrocarbon or natural gas may be employed as stream 50, in which case stream 30 will be omitted.

A hot reducing gas stream 32 is discharged from unit 29 above the fluid bed at a temperature generally in the range of about 700° C. to 900° C. Stream 32 is a gas stream which principally contains elemental sulfur vapor, carbon monoxide, carbon dioxide and nitrogen. The elemental sulfur vapor is recovered by cooling the gas stream 32 to attain selective condensation of product elemental sulfur. Stream 32 is initially passed through heat exchanger 33, and is cooled to a temperature generally in the range of about 300° C. to 500° C. by heat exchange with ambient air stream 34, which is admitted to unit 33 at a temperature generally in the range of 10° C. to 30° C., and which is discharged as stream 30 at a temperature in the range of about 400° C. to 500° C. and employed in the process as described supra.

The cooled process gas stream 35 discharged from unit 33 at a temperature of about 300° C. to 500° C. is passed downwards through the converging section 36 of a venturi gas scrubber defined by converging section 36, throat section 37 and diverging section 38. The venturi gas scrubber is defined by sections 36, 37, and 38. Elemental sulfur vapor is selectively removed from the gas stream 35 by contact with recirculating molten liquid sulfur stream 39, which is admitted onto the inner surface of converging section 36 and is dispersed into the gas stream in section 37. The resulting gas-liquid mixture is passed downwards through settling and separation section 40, from which the resulting gas stream 41, now substantially free of sulfur vapor, is discharged to atmosphere or burned. Molten liquid sulfur stream 42 is discharged from the bottom of unit 40 and divided into product elemental sulfur stream 43 and recycle stream 39, which is now usually cooled by means not shown and recycled as described supra.

Alkali solids stream 31, produced from unit 29 as described supra, is passed into tank 44. A makeup stream 45 which may consist of water, solid alkali carbonate or hydroxide, or an aqueous alkali carbonate or hydroxide solution, will also usually be passed into tank 44. The streams are mixed in tank 44, which is provided with agitator or stirrer 46, and the solids components are dissolved and uniformly mixed into the liquid phase. The resulting solution stream 47 is combined with stream 21 to form stream 48, which is combined with stream 12 and with oxidation inhibitor stream 49, to form stream 6. Stream 49 may consist of any suitable inhibitor for the prevention of sulfite oxidation, such as quinol, glycine or catechol.

Numerous alternatives within the scope of the present invention will occur to those skilled in the art. The ranges of operating variables such as temperature and solution concentration constitute preferred ranges of these variables for optimum utilization if the process concepts of the present invention, and the invention may be practiced outside of these ranges in suitable instances. A portion of the alkali may be converted to bicarbonate in solution while flowing through sections 3, 4, 5 and 8. Other means for gas-liquid contact may be provided instead of the venturi gas scrubbers defined by sections 3, 4 and 5, and sections 36, 37 and 38. Thus, in some instances, spray towers, packed towers or orifice scrubbers may be provided. Other known venturi configurations may be provided in practice, thus, section 3 may be provided with a lower horizontal lip which extends inwards and serves to project stream 6 transversely into the gas stream. As an alternative, nozzles 7 could be disposed transversely at section 4, to project stream 6 into the highly accelerated gas stream within section 4. Similar considerations apply to the scrubbing function of sections 36, 37 and 38.

In instances when stream 1 is substantially free of entrained solid particles, unit 14 and its function may be omitted. Stream 22 may essentially consist solely of alkali sulfite, in instances when stream 1 is substantially free of sulfur trioxide. Stream 27 may be omitted in some instances, in which case unit 29 may alternatively consist of a rotary kiln or other apparatus for high temperature reduction of the inorganic salts by contact with a reducing gas. A suitable fuel, such as a fluid hydrocarbon or coal, will be burned with stream 30 as stream 50 in unit 29. Streams 49 and 21 may alternatively be added via tank 44. In some instances, such as when stream 1 contains a substantial proportion of sulfur trioxide rather than sulfur dioxide, stream 49 may be omitted.

An example of an industrial application of the process of the present invention to the flue gas stream discharged from a coal-burning power plant will now be described.

EXAMPLE

The process of the present invention was applied to the treatment of the flue gas discharged from a 400 mw. coal burning power station, which burned bituminous coal containing 2.5% sulfur and 10% ash, and discharged 27,750 cubic meters per minute of flue gas at 150° C., which contained 1,950 parts per million (p.p.m.) of sulfur dioxide and 171.2 grains of fly ash per standard cubic meter of gas before treatment. The final treated flue gas discharged to the stack contained 100 p.p.m. of sulfur dioxide and 3.42 grains of fly ash per standard cubic meter if treated flue gas.

Following are the operating conditions for principal process streams.

| Stream No. | Temp., ° C. | Flow rate | Composition or contents |
|---|---|---|---|
| 1 | 150 | 27,750 cubic meters/minute. | 1,950 p.p.m. sulfur dioxide, 171.2 grain fly ash/s.c.m. |
| 6 | 60 | 51,000 liters/minute. | 3 grams sodium carbonate and and 17 grams of sodium sulfite and sulfate per 100 ml. solution plus suspended ash. |
| 10 | 70 | | 100 p.p.m. sulfur dioxide, 3.42 grains fly ash/s.c.m. |
| 13 | 70 | 1,515 liters/minute. | Same as stream 6. |
| 15 | | 335 tons/day | |
| 26 | | 308 tons/day | 91% sodium sulfite, balance sodium sulfate. |
| 27 | | 175 tons/day | Pulverized coal. |
| 30 | | 4 | Air. |
| 31 | | 260 tons/day | Sodium carbonate. |
| 32 | 870 | | |
| 34 | 25 | | Ambient air. |
| 35 | 480 | | |
| 43 | | 78 tons/day | Liquid elemental sulfur. |

We claim:
1. In a process for the removal of sulfur dioxide from a waste gas stream in which a waste gas stream containing sulfur dioxide is scrubbed with an aqueous scrubbing solution containing a dissolved alkali, whereby sulfur dioxide is absorbed from said waste gas stream into said aqueous solution and the absorbed sulfur dioxide reacts with alkali in said solution to form alkali sulfite and alkali sulfate in a resulting solution, said resulting solution is processed to separate alkali sulfite and alkali sulfate from residual solution, said separated alkali sulfite and alkali sulfate are processed to form regenerated alkali, said regenerated alkali is added to said residual solution, and the resulting residual solution is recycled for further waste gas scrubbing, the improvement which comprises:
 (a) boiling said resulting solution containing dissolved alkali sulfite and alkali sulfate from an initial temperature in the range of about 45° C. to 65° C., to a final temperature in the range of about 5° C. to 40° C., whereby solid alkali sulfite and alkali sulfate are precipitated,
 (b) separating the precipitated solid alkali sulfite and alkali sulfate from the residual solution,
 (c) mixing said solid alkali sulfite and alkali sulfate with carbon,
 (d) contacting the solids mixture of alkali sulfite, alkali sulfate and carbon with a hot reducing gas selected from the group consisting of a cracked hydrocarbon and natural gas, at elevated temperature in the range of 700° C. to 1000° C., whereby elemental sulfur vapor is liberated in said reducing gas stream and the alkali sulfite and alkali sulfate are converted to said regenerated alkali as a solid alkali salt,
 (e) recycling said solid alkali salt for addition to said residual solution as said regenerated alkali, and
 (f) cooling said reducing gas stream to selectively condense product elemental sulfur.
2. The process of claim 1, in which said solid alkali sulfite and alkali sulfate separated from residual solution according to step (b) are dehydrated prior to mixing with solid carbon according to step (c).
3. The process of claim 1, in which said alkali is selected from the group consisting of sodium carbonate and sodium hydroxide, and said aqueous scrubbing solution contains in the range of about 1 to 5 grams of dissolved alkali per 100 ml. of aqueous scrubbing solution.
4. The process of claim 1, in which said waste gas stream is a flue gas containing fuel ash, said ash is entrained in said aqueous scrubbing solution, and the resulting aqueous scrubbing solution containing solid ash and dissolved alkali sulfite and alkali sulfate is processed to remove the solid ash prior to step (a).

(References on following page)

References Cited

UNITED STATES PATENTS

| | | | |
|---|---|---|---|
| 2,177,707 | 10/1939 | Gaither | 23—225 |
| 2,780,307 | 2/1957 | MacAfee | 55—73 X |
| 2,994,588 | 8/1961 | Eickmeyer | 23—225 |
| 3,111,377 | 11/1963 | Mugg | 23—48 |
| 3,148,950 | 9/1964 | Mugg | 23—224 |
| 1,865,754 | 7/1932 | Hand | 23—129 |
| 3,438,733 | 4/1969 | Graniham et al. | 23—224 |
| 3,438,734 | 4/1969 | Graniham et al. | 23—224 |

OSCAR R. VERTIZ, Primary Examiner

G. O. PETERS, Assistant Examiner

UNITED STATES PATENT OFFICE
CERTIFICATE OF CORRECTION

Patent No. 3,533,748            Dated     October 13, 1970

Inventor(s) Edward Z. Finfer and Howard P. Willett

It is certified that error appears in the above-identified patent and that said Letters Patent are hereby corrected as shown below:

Col. 2 line 49, read "volumes" instead of "volues".

Col. 6 line 16, read "425" instead of "4".

Claim 1 step (a) at col. 6 line 37, read "cooling" instead of "boiling".

SIGNED AND SEALED
DEC 15 1970

(SEAL)
Attest:

Edward M. Fletcher, Jr.
Attesting Officer

WILLIAM E. SCHUYLER, JR.
Commissioner of Patents